(12) United States Patent
Voutchkov

(10) Patent No.: US 7,749,386 B2
(45) Date of Patent: *Jul. 6, 2010

(54) DESALINATION SYSTEM

(75) Inventor: Nikolay Voutchkov, Stamford, CT (US)

(73) Assignee: Poseidon Resources IP LLC, Huntington Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/171,378

(22) Filed: Jul. 1, 2005

(65) Prior Publication Data

US 2005/0236309 A1    Oct. 27, 2005

Related U.S. Application Data

(63) Continuation of application No. 10/330,207, filed on Dec. 30, 2002, now Pat. No. 6,694,081.

(60) Provisional application No. 60/343,231, filed on Dec. 31, 2001.

(51) Int. Cl.
*B01D 61/00* (2006.01)
*B01D 63/00* (2006.01)

(52) U.S. Cl. .................. 210/652; 210/97; 210/102; 210/195.2; 210/257.2; 210/175; 60/648

(58) Field of Classification Search ......... 210/652–653, 210/774, 149, 175, 105.2, 90, 257.2, 190, 210/767, 195.2, 97, 102; 60/650, 648, 203.1, 60/39, 441.2, 690; 203/10, DIG. 20, 11, 203/173; 202/176, 155, 82, 174; 261/110
See application file for complete search history.

(56) References Cited

U.S. PATENT DOCUMENTS

| 3,352,107 | A |   | 11/1967 | Blaskowski |          |
|-----------|---|---|---------|------------|----------|
| 3,671,404 | A |   | 6/1972  | Meckler    |          |
| 3,816,266 | A | * | 6/1974  | Izumi et al. | 203/11 |
| 3,890,207 | A | * | 6/1975  | Chapman et al. | 203/11 |
| 4,083,781 | A |   | 4/1978  | Conger     |          |
| 4,141,825 | A |   | 2/1979  | Conger     |          |
| 4,161,445 | A |   | 7/1979  | Colillet   |          |
| 4,169,789 | A |   | 10/1979 | Lerat      |          |
| 4,347,704 | A | * | 9/1982  | Marquardt et al. | 60/648 |
| 4,354,939 | A |   | 10/1982 | Dohl       |          |

(Continued)

FOREIGN PATENT DOCUMENTS

IL    67054 A    3/1989

(Continued)

*Primary Examiner*—Ana M Fortuna
(74) *Attorney, Agent, or Firm*—Dickstein Shapiro LLP

(57) ABSTRACT

The invention provides methods and an apparatus for more efficiently and economically producing purified water from sea water or some other salty or brackish water source. The efficiency is derived from the co-location with a power plant or other thermal generating source that will heat the feed water. Reverse osmosis membrane filtration systems work optimally when the feed water is at certain higher temperature, where that temperature is typically higher than the feed water at ambient temperatures. By using the heated sea water as the byproduct of the power plant electricity generating process and if necessary mixing it with ambient temperature sea water, if needed to lower the water temperature, and using this feed water with a higher temperature than ambient water temperature, the efficiency of the reverse osmosis system can be increased.

27 Claims, 1 Drawing Sheet

U.S. PATENT DOCUMENTS

| | | | |
|---|---|---|---|
| 4,434,057 A | 2/1984 | Marquardt | |
| 4,765,514 A | 8/1988 | Berglund | |
| 5,076,934 A | 12/1991 | Fenton | |
| 5,098,575 A | 3/1992 | Yaeli | |
| 5,128,042 A | 7/1992 | Fenton | |
| 5,238,574 A | 8/1993 | Kawashima et al. | |
| 5,329,798 A | 7/1994 | Takakura et al. | |
| 5,346,592 A * | 9/1994 | Madani | 202/176 |
| 5,547,584 A | 8/1996 | Capehart | |
| 5,622,605 A | 4/1997 | Simpson et al. | |
| 5,645,693 A | 7/1997 | Gode | |
| 5,651,894 A | 7/1997 | Boyce et al. | |
| 5,814,224 A | 9/1998 | Khamizov et al. | |
| 5,980,716 A * | 11/1999 | Horinouchi et al. | 204/524 |
| 6,083,382 A * | 7/2000 | Bird | 210/96.2 |
| 6,100,600 A | 8/2000 | Pflanz | |
| 6,126,834 A | 10/2000 | Tonelli et al. | |
| 6,183,646 B1 | 2/2001 | Williams et al. | |
| 6,187,200 B1 | 2/2001 | Yamamura et al. | |
| 6,190,556 B1 | 2/2001 | Uhlinger | |
| 6,190,558 B1 | 2/2001 | Robbins | |
| 6,299,766 B1 | 10/2001 | Permar | |
| 6,306,291 B1 | 10/2001 | Lueck | |
| 6,468,431 B1 | 10/2002 | Oklelas, Jr. | |
| 6,508,936 B1 | 1/2003 | Hassan | |
| 6,647,717 B2 | 11/2003 | Zaslavsky et al. | |
| 6,679,988 B2 * | 1/2004 | Gsell | 210/181 |
| 6,783,682 B1 | 8/2004 | Awerbuch | |
| 6,833,056 B1 * | 12/2004 | Kamiya et al. | 202/155 |
| 6,905,604 B2 * | 6/2005 | Taber | 210/652 |
| 6,946,081 B2 * | 9/2005 | Voutchkov | 210/774 |
| 7,037,430 B2 * | 5/2006 | Donaldson et al. | 210/652 |
| 7,081,205 B2 * | 7/2006 | Gordon et al. | 210/652 |
| 7,083,730 B2 * | 8/2006 | Davis | 210/652 |
| 7,118,307 B2 * | 10/2006 | Stoecker et al. | 405/50 |
| 7,128,310 B2 * | 10/2006 | Mockry et al. | 261/112.1 |
| 7,178,337 B2 * | 2/2007 | Pflanz | 60/641.2 |
| 7,225,620 B2 * | 6/2007 | Klausner et al. | 60/641.1 |
| 7,239,037 B2 | 7/2007 | Alstot et al. | |
| 7,329,962 B2 | 2/2008 | Alstot et al. | |
| 7,416,666 B2 | 8/2008 | Gordon | |

FOREIGN PATENT DOCUMENTS

| | | | |
|---|---|---|---|
| WO | WO 97/18166 | * | 5/1997 |
| WO | WO 2006/106158 | | 10/2006 |

* cited by examiner

DESALINATION SYSTEM

This application is continuation of U.S. patent application Ser. No. 10/330,207, filed Dec. 30, 2002, now issued as U.S. Pat. No. 6,694,081, which is based on U.S. provisional application Ser. No. 60/343,231, filed Dec. 31, 2001 which are incorporated by reference in their entirety.

BACKGROUND

The present invention relates generally to desalination of seawater and, more particularly, to methods and an apparatus for desalination of seawater using reverse osmosis membranes.

The desire to make drinkable, potable water out of seawater has existed for a long time. Several approaches can be taken to remove the salt and other chemicals. Water distillation is one way to approach the goal, but may not be commercially feasible. In this approach, water is heated to separate the solids from the liquid and therefore remove the salt solids. Another approach is electrodialysis in which the ions forming the salt are pulled by electric forces from the saline water through membranes and thereafter concentrated in separate compartments. This approach is also very expensive. A third approach to desalination is through reverse osmosis. This method uses pressure to force salty feed water against membranes which allows the relatively salt free water to pass through, but not much of the salts or other minerals. But due to the high production and capital costs, desalination systems are not widely used for making large scale supplies of public drinking water.

Efforts have been made to increase the efficiency of reverse osmosis systems in general and specifically, with respect to a desalination system, to lower operating and fixed costs. Some efforts have been directed at the improving the efficiency of the filtration systems, other efforts have been directed at the design and application of filter membranes, multi stage filtering and nano-filtration methods. Other efforts have also been directed at improving the efficiency of other aspects of a reverse osmosis system. For example, some efforts have been directed at the membrane filtration system replacement method by monitoring the silt density and at the application of particular feed water pressures.

Each of these efforts may increase the efficiency of the desalination system, but these efforts may not sufficiently reduce the cost of the system for use for public ware supply. What is needed is a desalination system that processes seawater into potable water more cost effectively for use for public water supply.

SUMMARY

The present invention provides a purification system for desalinating water having two water supply sources: an ambient feed water source for inputting ambient feed water; and a high temperature feed water source for inputting high temperature feed water, where the high temperature is a temperature higher than the ambient temperature. A blender mixes together the ambient and high temperature feed water to achieve a blended feed water temperature in a desirable range. The blended feed water is then desalinated in a reverse osmosis process.

In one aspect, the second source of water is derived from a power plant that uses seawater as a coolant and outputs heated seawater through a high temperature feed water line. The water supply for seawater coolant for the power plant may be the same water supply used for the ambient water line.

In another aspect, the first source of water for ambient temperature water is drawn by an ambient variable speed pump, which is controlled by a controller and is output through a feed water line to a blending process. The heated water source of water is drawn by a high temperature variable speed pump, which is controlled by a controller, and is output through a feed water line to a blending process.

In another aspect, using temperature sensors located in the ambient feed water line, the high temperature feed water line, and the output of the blending process the controller mixes the two streams of water to achieve a desired temperature of blended water.

In another aspect, the controller may adjust the mixture based on the desirability of other factors, such as water salinity. The blended water is then pretreated which separates the water into solids, unusable water and usable water. Unusable water is delivered to a discharge area which maybe the same discharge area used by the power plant. The pretreatment solid waste is delivered to a landfill. The usable water is then delivered to the desalination process.

In yet another aspect, in the desalination process, a pump, controlled by a controller, delivers the water to a first stage reverse osmosis filter. The controller may adjust the pump by using input from temperature or water pressure sensors located in the water line in between the pump and the filter. The water is then filtered into potentially usable and unusable water. Unusable water is delivered to a discharge area and may pass through an energy recovery pump. Potentially usable is then separated into usable water and water that requires further filtration. Some of the water is passed through a pump and then delivered to a second filter process. The controller may adjust the pump by using input from temperature or water pressure sensors located in the water line in between the pump and the filter. The water is then filtered into potentially usable and unusable water. Unusable water is delivered to a discharge area. Usable water is then mixed with usable water from the first filtration and delivered into a storage tank. This water may be then treated for lime stabilization and then chlorination and then stored for use.

Other embodiments of the invention may use different desalination processes. Approaches may utilize variations on the number and type of reverse osmosis filters. Other approaches may apply a desalination technique other than reverse osmosis.

These and other features and advantages of the invention will be more clearly understood from the following detailed description and drawing of a preferred embodiment of the present invention.

BRIEF DESCRIPTION OF THE DRAWING

The FIGURE is a schematic illustration of a desalination system according to a preferred embodiment of the present invention.

DETAILED DESCRIPTION OF A PREFERRED EMBODIMENT

Figure 1:
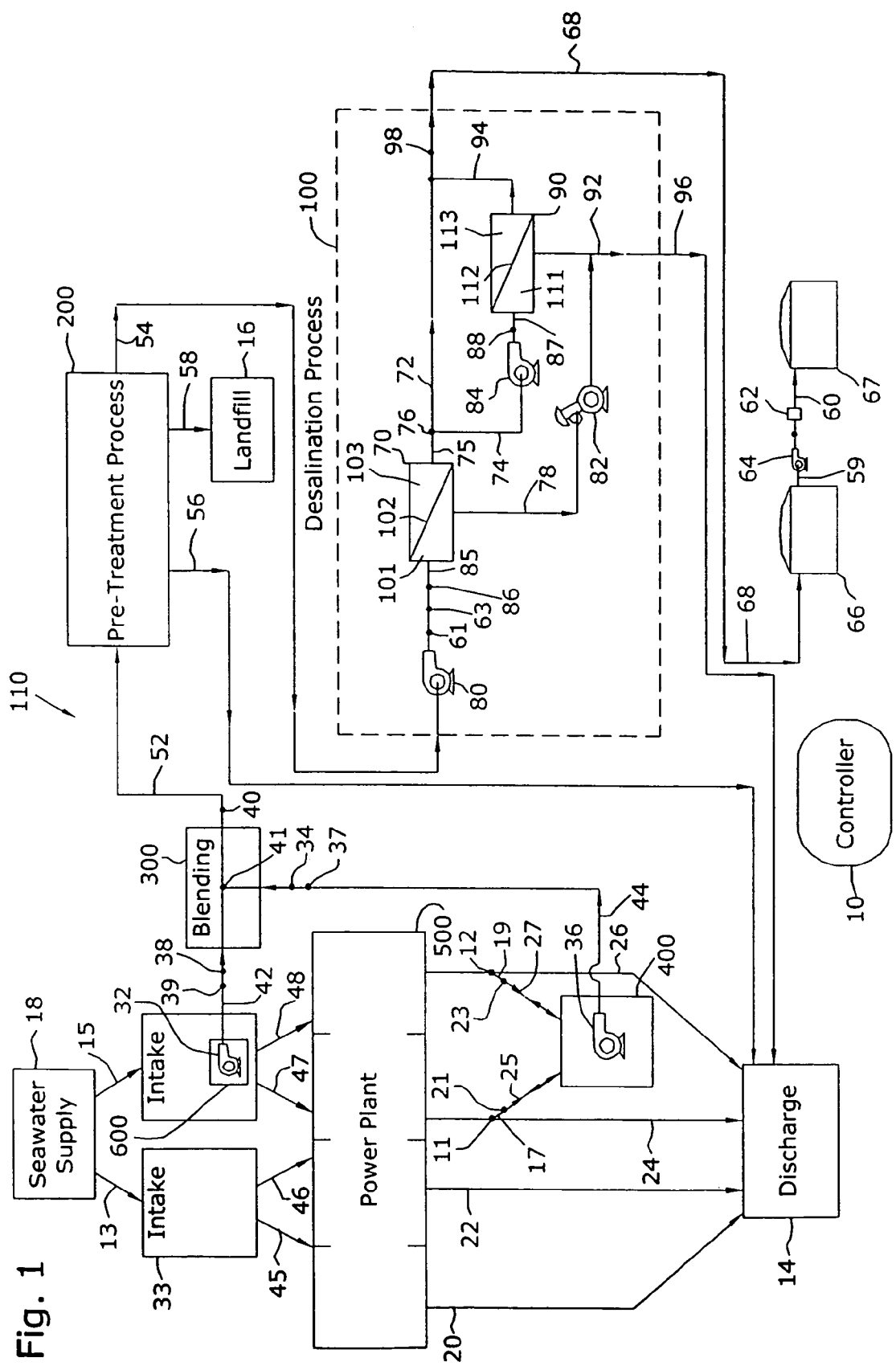

Referring to the FIGURE, there being shown a desalination system, generally designated by reference numeral 110, according to a preferred embodiment of the present invention. Desalination processes for producing purified water from seawater or some other salty or brackish water source, generally work more efficiently at particular ranges of temperature, depending on the nature, geometry, pressure and other parameters of the given desalination process. The embodiment illustrated in the FIGURE uses first and second pass reverse osmosis filter processes 70 and 90 for desalination.

Separation of liquids from particulate solids, and colloidal and ion size particles can be achieved by a number of technologies using microfiltration, ultrafiltration, nanofiltration and reverse osmosis membranes. These technologies have been commercially available and proven on a number of full-scale installations worldwide over the last 20 years. However, the wide application of the membrane separation technologies have been limited by the high power costs related to pressurizing the treated liquid against the membranes. This is especially true for seawater desalination technologies using reverse osmosis membranes, where the operating pressures required to separate monovalent and divalent ions from the intake water are very high (about three hundred (300) p.s.i. to about twelve hundred (1,200) p.s.i.).

One of the key factors influencing the pressure required to achieve a given level of product water quality is the temperature of the water fed to the membrane elements. The effect of temperature on reverse osmosis and nanofiltration membranes is driven by the phenomenon of increased system enthalpy. As the temperature decreases, the membrane element material becomes more rigid and water flux through the membranes decreases. Increase in feed temperature relaxes the bonds within the membrane matrix and water and salt molecules move more rapidly. As a result of the looser matrix structure, water passes through the membrane pores at lower applied pressure than the pressure needed at low temperatures.

For a temperature range between about five (5) and about forty (40) degrees Celsius, the pressure required to achieve the same membrane water productivity (flux) decreases proportionally to the increase in temperature. Typically, about eighty percent (80%) higher pressure, and therefore correspondingly higher power use, is needed to produce the same water quality and quantity when the feed water temperature is about five (5) degrees Celsius compared to that when the feed water temperature is about twenty (25) degrees Celsius.

The beneficial effect of feed water temperature is observed for temperatures of up to about forty (40) degrees Celsius. Higher temperatures, e.g., temperatures above forty (40) degrees Celsius, result in compaction of the membrane material, which ultimately causes reduction of the membrane's useful life and significant deterioration of product water quality.

It should be noted that an increase in temperature results in an increased passage of both water and ion molecules through the membrane matrix. Because the membrane material is specifically designed to reject salts, rather than water, the magnitude of increase in product water salinity in the final product with increase in temperature, is significantly lower than the increase of membrane flux or decrease of pressure. As the temperature of the feed water rises, the feed pressure decreases and the product water salinity increases slightly.

Product water salinity increases at significantly lower rate than the rate of decrease of pressure needed to produce this water. Therefore, to the point the actual product water salinity reaches the target product water salinity concentration, the overall effect of feed water temperature increase on water production economics is positive. This operational point of the system is called "optimum temperature point." At this optimal temperature, target product water salinity is achieved at minimum pressure and/or maximum flux. If the feed water temperature exceeds the optimum point, the product water salinity deteriorates to a level where the system capacity has to be reduced below its target value to produce the same water quality.

It should be noted that the optimum temperature point for a given membrane system and feed water source depends on many factors including: the actual feed water salinity; the target product water salinity; the content of substances with high scaling potential in the feed water, pH, and other water quality parameters. See, for example "Manual of Membrane Processes for Drinking Water Treatment," by Mark A. Thompson, et al., October 1996, Malcolm Pirnie. Most important of these control parameters are the intake and the product water salinity concentrations. Typically, for a given membrane system the product water salinity is a constant target set by the type of use of the water, e.g., potable, industrial, or other use. Therefore, generally, the main control parameter is the intake water salinity. If intake water salinity increases, typically the optimum temperature point value decreases. Therefore, by controlling the intake water temperature the system power demand can be minimized (continuously operated at the optimum temperature point) under changing intake water salinity and/or other water quality parameters.

Currently, typical sources of water for seawater desalination installations are brackish groundwater pumped using wells and/or seawater collected directly from the ocean via an open intake structure. Seawater and groundwater have relatively low temperatures, which fluctuate daily and seasonally. Currently, desalination water installations are designed for the lowest occurring daily average temperatures to secure consistent product water quantity and quality at any given time. To compensate for the negative effect of low temperature feed water on the system design, additional number of membranes and/or higher feed pressures (larger pumps and higher rating piping) must be applied. These additional membranes and the installations housing them increase the overall membrane system costs. In addition, at lower temperatures the desalination system has to be operated at high pressures to produce the same water quantity, which results in high power costs and ultimately shorter membrane useful life.

The desalination system of the illustrated embodiment reduces desalination facility water production costs by automatically adjusting the membrane feed water temperature to its optimum temperature point to accommodate changing feed intake water temperature and quality at the same time maintaining consistent product water quality at a target level. The system includes the following elements: Source and intake of seawater of ambient temperature; Source and intake of seawater of elevated temperature; Feed pumps and pipelines conveying seawater from the high- and low-temperature water sources to the desalination facility; Blending device for the high-temperature and low-temperature feed water stream; Variable frequency drives ("VFD") installed on the low-temperature feed water pumps; Water conductivity/salinity meters installed on the high-temperature temperature and/or low-temperature feed lines; Water temperature sensors and signal transmitters installed on the high-temperature, low temperature and blended feed water lines; Membrane system differential pressure sensors, transmitters and controls; and Monitoring and control instrumentation allowing adjustment of blended feed water temperature as a function of the membrane system differential pressure readings/signal and product water salinity.

Typical sources of intake water of elevated temperature are power plant outfalls. The source of intake water of ambient temperature could be the intake wet well of the power plant feed pumps or a separate seawater, groundwater or freshwater intake. The prime source of feed water is the elevated temperature source. The two key control parameters of the temperature adjustment system are product water salinity and membrane differential pressure.

Thus, to enhance the efficiency of the desalination process, it is desirable to maintain the temperature of the water at the membrane within a predetermined range of temperature.

In the illustrated embodiment, two supplies of seawater are provided. The first supply 600, referred to as the ambient water, is seawater taken from the sea, bay or other source and is at a relatively low temperature. The temperature of the ambient water may be different from the original source, because of heating or cooling caused by, for example, handling, pumping, exposure to solar heating or heating or cooling by the atmosphere. The second supply 400, referred to as the high temperature water is seawater that has been delivered through the cooling system of a power plant 500. The high temperature water should normally be substantially hotter than the ambient water.

The high temperature seawater is mixed as necessary with the ambient temperature seawater to achieve a temperature of the seawater at the membranes in the range of desired temperatures to thus enhance the efficiency of the reverse osmosis process. Additional efficiency results from the location of the desalination process near a power plant or other thermal generating source, so that waste heat may be used to heat the high temperature water. This reduces or eliminates the need to provide supplemental heating for the seawater in the desalination process. Also, the efficiency of the reverse osmosis system can be enhanced by monitoring conditions such as pressure, temperature and salinity and adjusting the temperature, salinity and pressure of the feed water in response to those conditions. In addition, the use of energy recovery systems, such as heat recovery turbines, may also increase efficiency of the desalination process.

As shown in the FIGURE, water is drawn from sea water supply 18, such as an intake canal off an ocean, salt water lake, bay, or other water source, into a first intake 33 and a second intake process 35 by pumps (not shown) through a first and second sea water input line 13 and 15. Sea water input lines 13 and 15 include a course or rough filter to remove large sediment, debris and fish from the seawater. The water is then delivered from the intake processes 33, 35 to the power plant 500 through power plant input lines 45, 46, 47, and 48. Water is also delivered from the intake process 35 to a first variable speed pump 32, and then delivered through an ambient feed water line 42. The water supplied through ambient feed water line 42 may also be referred to as the ambient water. The variable speed pump 32 is electronically controlled by input from controller 10. The variable speed pump 32 is connected to the controller 10 through appropriate and necessary electrical connections. Connections for the first variable speed pump 32 and other components to the controller 10 are not shown in the FIGURE. Controller 10 may provide for both manual and automatic control of the system. Although this embodiment provides for a plurality of intake systems and intake lines, a plurality is not required.

A power plant 500, as part of its normal operation, will utilize a local water source to input a stream of water to absorb heat that results from the power generation process and output the water at a relatively higher temperature than when it was first drawn from the water supply. In the FIGURE, water will be output through power plant output lines 20, 22, 24 and 26. One of the sources of increased efficiency in the present invention is the use of heated supply water which is a byproduct of the power plant. Other embodiments may utilize other heat generating sources that generate heated water as a by product of the system; therefore supplying heated water without significantly increasing the cost of the desalination system.

Heated water leaves power plant 500 through power plant output lines 20, 22, 24, 26 and is directed to discharge 14. Diverters 11, 12 located in power plant output lines 24 and 26 direct water through lines 17 and 19, respectively, to a high temperature water pump station 400 and the second variable speed pump 36 contained within. Controller 10 monitors the water temperature in lines 17 and 19 through temperature sensors 21 and 23, located respectively with those lines. Controller 10 controls the flow of water from line 17 and 19 into high temperature pump station 400 by adjusting gates 25 and 27, which are located in between temperature sensors 21 and 23 and high temperature water pump station 400. The controller 10 may select water from a combination of lines 24 and 26 dependant on the temperature of the water in lines 17 and 19 and the desired water temperature desired by blending process 300, discussed below. The resulting water is output from the high temperature water pump station 400 by variable speed pump 36 through a high temperature feed water line 44.

In the blending process, the ambient and high temperature water are mixed. Ambient temperature feed water, flowing through line 42, and high temperature water feed water, where the high temperature water is water that has a relatively higher temperature than the ambient water, flowing through line 44 merge in blending process 300. Controller 10, using input from temperature sensors 34, 38, and 40, and possibly input from salinity sensors 37 and 39, which are located in lines 42 and 44, respectively, just prior to blending process 300, adjusts variable speed pump 36 and 32 and blender 41 to attain the preferred temperature range of feed water. The resulting water is output through a blended feed water line, line 52. The determination of the preferred temperatures is known to those skilled in the art. In another embodiment, it might be desirable to adjust the blending process to reach a preferred water salinity level, or, possibly, a combination of both factors.

In a preferred embodiment of the invention, water goes through an initial pretreatment filtering process. After blending, the feed water enters the pretreatment process 200 through line 52 wherein the feed water undergoes an initial filtering process. In this step, the incoming water is separated into solids, usable water, and undesirable water. Unusable water leaves pretreatment process 200 proceeds to discharge 14 through a pretreatment unusable water line, line 56. Solids that result from pretreatment process 200 are delivered to landfill 16 through a pretreatment solid waste line, line 58. The remaining, usable, water leaves through a filtered feed water line, line 54.

Membrane filters may require pre-treatment filtering directed at additional water characteristics, such as acidity.

A preferred embodiment of the invention employs a two (2) stage, or two (2) pass, reverse osmosis filter process as the desalination method. Feed water enters the desalination process 100 though line 54 where it is directed to a first membrane filter, a first feed pump 80, then proceeds into a first membrane filter, first pass filter process 70, through a first purification pump line, line 85. First pass filter 70 has a membrane 102 which separates relatively salty water 101 from relatively less salty water 103. Controller 10 adjusts the pressure of the water delivered to membrane filter by input from pressure sensor 86, which is located in line 85, and controlling pump 80. Controller 10 may also utilize temperature, as determined from temperature sensor 61 located in feed line 85, and salinity, as determined from salinity sensor 63 located in feed line 85, to adjust the pressure. The controller 10 may also adjust the water pressure delivered by the pump 80 by measuring the differential pressure in the first stage filter 70.

Saltier water, unusable for purification, leaves first pass filter process 70 through a first membrane unusable line, line 78; and the remaining water leaves first pass filter process 70 through a first membrane output line, line 75, where it is delivered to separator 76. Separator 76 separates some of the water, preferably less than about half and more preferably about 5% to about 15%, and delivers that water through a first membrane potentially usable line, line 74, into a second membrane feed pump, second feed pump 84, which is then delivered to a second membrane filter, second pass filter process 90, through a second purification feed pump line, line 87; the remaining water proceeds through a first membrane usable line, line 72.

Second pass filter process 90 has a membrane 112 which separates relatively salty water 111 from relatively less salty water 113. Controller 10 adjusts the pressure of the water delivered to membrane filter by input from pressure sensor 88, which is located in line 87, and controlling pump 84. The controller 10 may also adjust the water pressure delivered by the pump 84 by measuring the differential pressure in the second stage filter 90.

The relatively salty water leaves second pass filter process 90 through a second membrane unusable line, line 92, where it subsequently merges with line 78 and proceeds into a purification unusable output line, line 96, and directed into discharge 14. Furthermore, the application of an energy recovery turbine 82 located in line 78 is an additional mechanism utilized to recover energy from the system.

Highly purified water, the relatively less salty water, leaves second pass filter process 90 through a second membrane usable line, line 94, where it subsequently merges with line 72 producing water within a desired range of salinity, and proceeds into a purified line, line 68, and that water is directed into a storage tank, first storage tank 66. Controller 10 measures the salinity of the output water from salinity sensor 98 which is located in line 68. Water drawn from storage tank 66 by a pump, pump 64, by way of a first storage output line, line 59, proceeds through a treated line, line 60, where it undergoes water treatment 62 (typically lime stabilization and chlorination); then the water is delivered to storage tank 67 for later use as the finished purified water.

As the temperature of the source water rises and/or the feed water salinity decreases, the differential membrane pressure (e.g., total power cost) decreases and product water salinity increases. When product water salinity exceeds the target water quality level, in a preferred embodiment the flow rate of the low-temperature pump (e.g., the ambient water pump) is increased automatically (through the VFDs of the low-temperature pump based on on-line temperature and salinity sensor readings) to bring the product water salinity at the target level. Thereby, by automatic adjustment of the low-temperature feed pump flow rate, desalinated water of target quality is always produced at minimum pressure and power costs eliminating the negative effect of the fluctuations of feed water temperature and salinity on the overall desalination costs.

Although this embodiment suggests seawater at the supply source for feed water, any salty or brackish water supply may serve as the source. Furthermore, although a reverse osmosis desalination systems is shown, other desalination systems might also be utilized. Additionally, different variations of a desalination system would satisfy the requirements of the present invention, including varying the number and type of membranes utilized, the use of nano-filtration, varying water pressure, and the mixed use of natural and reverse osmotic approaches. Additionally, the disposition of sensors, mixers, blenders, pumps, and other elements in the above description and accompanying FIGURE may be modified and retain the spirit of the inventions.

The above description and drawings are only illustrative of preferred embodiments of the present inventions, and are not intended to limit the present inventions thereto. Any subject matter or modification thereof which comes within the spirit and scope of the following claims is to be considered part of the present inventions.

What is claimed as new and desired to be protected by Letters Patent of the United States is:

1. A method of desalinating salty water comprising the steps of:
   inputting salty feed water to a desalination plant;
   using for a part of said salty feed water, salty water output from a cooling system of an electricity generating power plant, said salty water output being at a first temperature higher than an ambient temperature;
   using for another part of said salty feed water, salty water that is at a second temperature that is lower than said first temperature, said salty feed water retaining some heat acquired from said power plant when said salty feed water is received by said desalination plant;
   operating the desalination plant to desalinate said salty feed water;
   outputting a product water that is relatively less salt than said salty feed water from said desalination plant;
   outputting an unusable water that is relatively more salty than said salty feed water from said destination plant; and
   measuring the salinity of said salty water output from the cooling system of said power plant, measuring the salinity of said salty water that is at a second temperature, and adjusting the amount of said salty water output from the cooling system of said power plant and said salty water that is at a second temperature that is input to the desalination plant according to their relative salinities based on a preferred product water salinity level.

2. A method as in claim 1, further comprising the steps of:
   using for said another part of said salty feed water a first portion of a supply of ambient temperature salty water; and
   blending said high temperature salty water and said ambient temperature salty water to provide said salty feed water.

3. A method as in claim 2, wherein said power plant has at least one intake for inputting a second portion of said supply of said ambient temperature salty water for cooling its power generating equipment, and further comprising the step of:
   using said intake of the power plant for providing to said desalination plant said first portion of said supply of said ambient temperature salty water.

4. A method as in claim 2, wherein said ambient temperature salty water is sea water.

5. A method as in claim 2, wherein said ambient temperature salty water is brackish water.

6. A method as in claim 1, wherein said power plant has at least one power plant cooling output line and at least one power plant discharge, and said power plant outputs a high temperature salty water that was used to absorb heat in the power plant through said power plant cooling output line to said power plant discharge, and further comprising the step of:
   taking some water from said power plant cooling output line upstream from said discharge for use as said high temperature salty water for the desalination plant.

7. A method as in claim 6, further comprising the step of: outputting at least a portion of said unusable water of the desalination plant to the power plant downstream from where said some water is taken from said power plant cooling output line for use as said high temperature salty water.

8. A method as in claim 6, further comprising the step of: outputting at least a portion of said unusable water of the desalination plant to the power plant discharge.

9. A method of desalinating salty water comprising the steps of:
- inputting salty feed water to a desalination plant;
- using for a part of said salty feed water, salty water output from a cooling system of an electricity generating power plant, said salty water output being at a first temperature higher than an ambient temperature;
- using for another part of said salty feed water, salty water that is at a second temperature that is lower than said first temperature, said salty feed water retaining some heat acquired from said power plant when said salty feed water is received by said desalination plant;
- operating the desalination plant to desalinate said salty feed water;
- outputting a product water that is relatively less salty then said salty feed water from said desalination plant;
- outputting unusable water that is relatively more salty than said salty feed water from said desalination plant; and
- measuring the temperature of said salty water output from the cooling system of said power plant, measuring the temperature of said salty water that is at a second temperature, and adjusting the amount of said salty water output from the cooling system of said power plant and said salty water that is at a second temperature that is input to the desalination plant according to their relative temperatures based on a preferred product water temperature.

10. A method as in claim 9, further comprising the steps of:
- using for said another part of said salty feed water a first portion of a supply of ambient temperature salty water; and
- blending said high temperature salty water and said ambient temperature salty water to provide said salty feed water.

11. A method as in claim 10, wherein said power plant has at least one intake for inputting a second portion of said supply of said ambient temperature salty water for cooling its power generating equipment, and further comprising the step of:
- using said intake of the power plant for providing to said desalination plant said first portion of said supply of said ambient temperature salty water.

12. A method as in claim 10, wherein said ambient temperature salty water is sea water.

13. A method as in claim 10, wherein said ambient temperature salty water is brackish water.

14. A method as in claim 9, wherein said power plant has at least one power plant cooling output line and at least one power plant discharge, and said power plant outputs a high temperature salty water that was used to absorb heat in the power plant through said power plant cooling output line to said power plant discharge, and further comprising the step of:
- taking some water from said power plant cooling output line upstream from said discharge for use as said high temperature salty water for the desalination plant.

15. A method as in claim 14, further comprising the step of: outputting at least a portion of said unusable water of the desalination plant to the power plant downstream from where said some water is taken from said power plant cooling output line for use as said high temperature salty water.

16. A method as in claim 14, further comprising the step of: outputting at least a portion of said unusable water of the desalination plant to the power plant discharge.

17. A purification system comprising:
- a first salty water, said first salty water being at an ambient temperature;
- a second salty water;
- a heat source for heating said second salty water to cause said second salty water to have a high temperature by exchanging heat from an electricity generating power plant to said second salty water such that said second salty water is a heated by-product of said rower plant, said high temperature being a temperature higher than the ambient temperature;
- a blender for mixing said ambient temperature first salty water and said high temperature second salty water, to thereby generate mixed ambient and high temperature feed water;
- a water purifier for desalinating said feed water and outputting a product water and an unusable water, said feed water being at a temperature higher than said ambient temperature;
- a first salinity sensor for sensing a salinity of the first salty water; and
- a second salinity sensor for sensing a salinity of the second salty water;
- a control;

wherein said blender is controlled by the control to adjust the mixing of said first and second salty waters based on input from first and second salinity sensors based on a preferred product water salinity level.

18. A purification system as in claim 17, further comprising: a filter system for filtering said feed water prior to desalinating said feed water.

19. A purification system as in claim 17, further comprising:
- a first temperature sensor for sensing said ambient temperature;
- a second temperature sensor for sensing said high temperature; and
- a third temperature sensor for sensing mixed ambient and high temperature.

20. A purification system as in claim 19 wherein said blender is controlled to adjust the mixing of said first and second salty waters based on input from at least one of said first, second and third temperature sensors.

21. A purification system comprising:
- a first salty water line for providing a first salty water from an intake, said first salty water being at an ambient temperature;
- a second salty water line for providing a second salty water;
- an electricity generating power plant, said second salty water having a high temperature by exchanging heat from said electricity generating power plant to said second salty water, where said high temperature is a temperature higher than the ambient temperature;
- a blender for mixing said first salty water and said second salty water, to thereby generate a mixed ambient and high temperature salty water;
- a water purifier for desalinating said mixed salty water and outputting a product water and an unusable water;
- a first salinity sensor for sensing said ambient salty water salinity; and
- a second salinity sensor for sensing said high temperature salty water salinity;

wherein said blender is controlled by the control to adjust the mixing of said first and second salty waters based on an input from said first and second salinity sensors based on a preferred product water salinity level.

22. A purification system as in claim 21, further comprising: a filter system for filtering said mixed ambient and high temperature salty water prior to said desalination.

23. A purification system as in claim 21, further comprising:
a first temperature sensor for sensing said ambient salty water temperature;
a second temperature sensor for sensing said high temperature salty water temperature; and
a third temperature sensor for sensing said mixed ambient and high temperature salty water temperature.

24. A purification system as in claim 23, wherein said blender is controlled to adjust the mixing of said first and second salty waters based on an input from said at least one of first, second and third temperature sensors.

25. A method of desalinating water comprising the steps of:
inputting a first portion of salty feed water into an electricity generating power plant, whereby said first portion of salty feed water is heated by said electricity generating power plant;
inputting into a desalination plant a portion of said heated first portion of salty feed water from said electricity generating power plant;
inputting into said desalination plant a second portion of salty feed water, said portion of said heated first portion of salty feed water being at a temperature higher than a temperature of said second portion of salty feed water when input to said desalination plant;
mixing said portion of heated first portion of salty feed water and said second portion of salty feed water;
desalinating in said desalination plant said mixed salty feed waters;
outputting from said desalination plant a product water that is relatively less salty then said mixed salty feed water;
outputting from said desalination plant an unusable water that is relatively more salty than said mixed salty feed water; and
measuring the salinity of said first portion of salty feed water, measuring the salinity of said second portion of salty feed water, and adjusting the amount of said first portion of salty feed water and said second portion of salty feed water that is input to the desalination plant according to their relative salinities based on a preferred product water salinity level.

26. A method of desalinating water as in claim 25, further comprising the steps of:
inputting into said electricity generating power plant said first portion of salty feed water from a first source of water; and
inputting into said desalination plant said second portion of salty feed water from a second source of water.

27. A method of desalinating water as in claim 26, further comprising the step of:
outputting, by said electricity generating power plant, another portion of said first portion of salty feed water to a discharge.

* * * * *